United States Patent [19]

Havens

[11] 3,941,266
[45] Mar. 2, 1976

[54] BALE LOADING AND STACKING APPARATUS

[76] Inventor: Allan R. Havens, 821 W. Knox Road, Beaverton, Mich. 48612

[22] Filed: Aug. 20, 1973

[21] Appl. No.: 389,494

Related U.S. Application Data

[62] Division of Ser. No. 227,850, Feb. 22, 1972, Pat. No. 3,807,579.

[52] U.S. Cl................. 214/518; 188/4 R; 214/6 B; 214/38 CC
[51] Int. Cl.² .................. B65G 57/32; A01D 87/12
[58] Field of Search........... 214/6 B, 16.1 CB, 38 R, 214/38 CC, 518, 519; 188/4 R

[56] References Cited
UNITED STATES PATENTS

| 828,633 | 8/1906 | Stuart................................. 188/4 R |
| 2,647,647 | 8/1953 | Alimanestiano............ 214/16.1 CB |
| 3,373,882 | 3/1968 | Forest................................ 214/6 B |
| 3,420,390 | 1/1969 | Taggart............................. 214/38 R |
| 3,446,369 | 5/1969 | May et al. .......................... 214/6 B |
| 3,486,636 | 12/1969 | Stroup............................... 214/6 B |
| 3,549,023 | 12/1970 | Backman............................ 214/6 B |

Primary Examiner—Robert J. Spar
Assistant Examiner—Leslie J. Paperner
Attorney, Agent, or Firm—John J. Swartz

[57] ABSTRACT

Bale loading apparatus for loading and stacking hay bales in combination with a wagon, which is drawn therebehind and has a pluarality of longitudinal stripping fingers on the front end thereof, comprising a mobile frame adapted to be drawn forwardly by a draft vehicle, a bale support rack on said frame provided with a plurality of open ended openings in longitudinal alignment with the wagon stripping fingers and being movable between a raised bale stack receiving position and a lowered bale depositing position, lost motion draft bar connection means coupling said wagon to said frame for forward movement therewith when the frame is moved forwardly and for limited movement relative thereto when the frame is moved rearwardly and means for vertically moving the bale support rack between the raised and lowered positions when the frame is moved rearwardly to transfer the row of stacks from the rack to the wagon supported stripping fingers.

6 Claims, 12 Drawing Figures

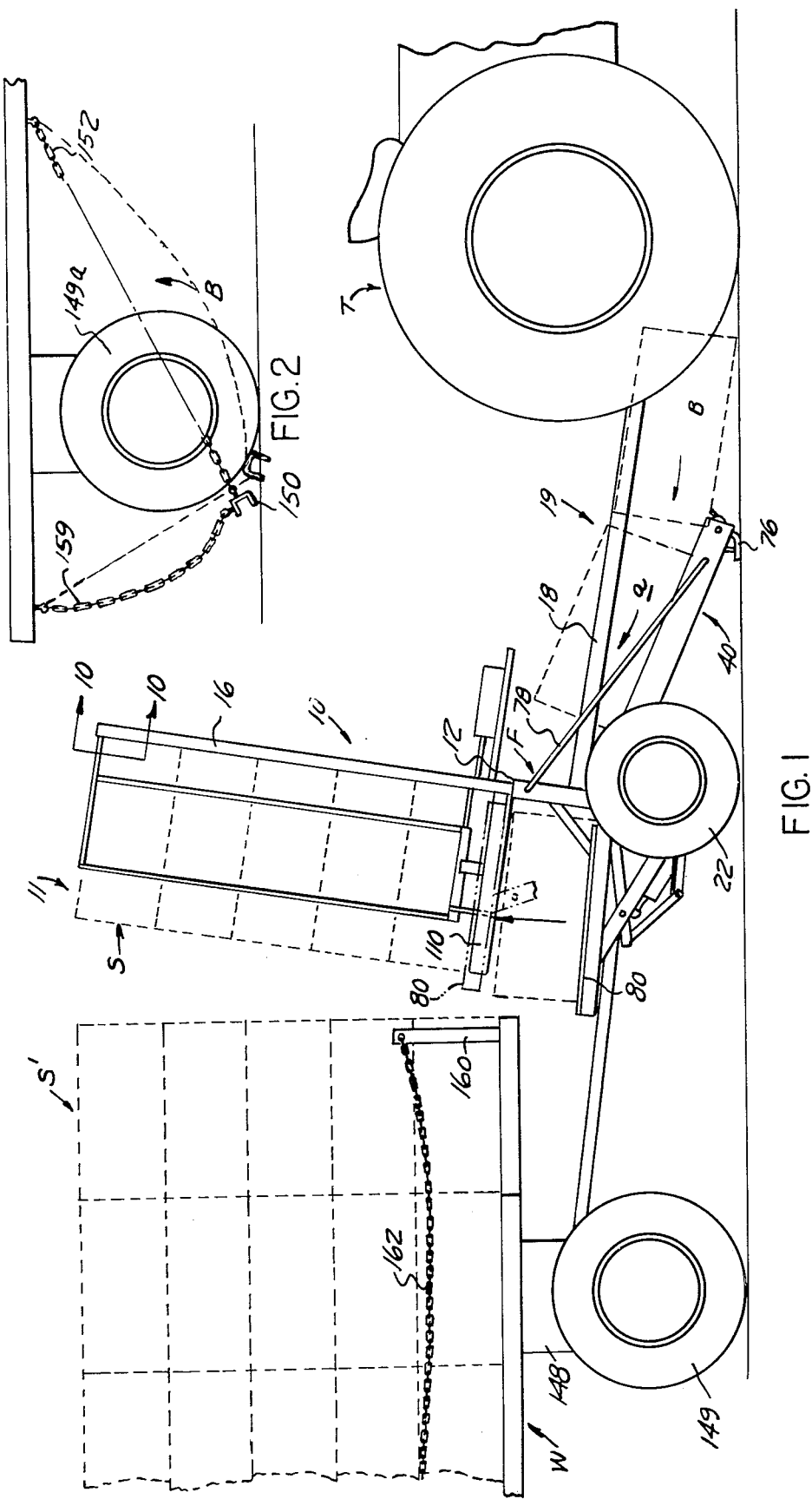

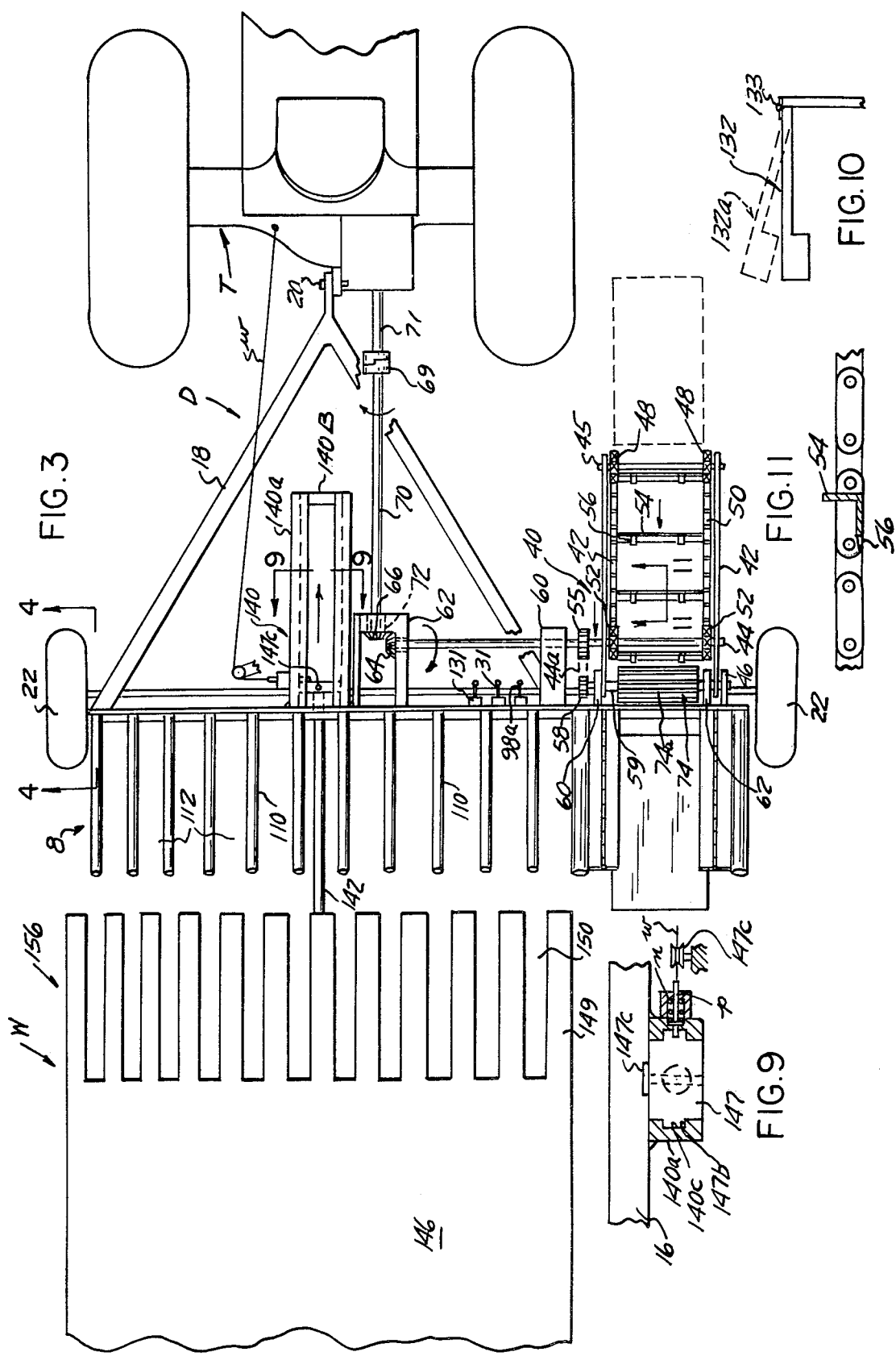

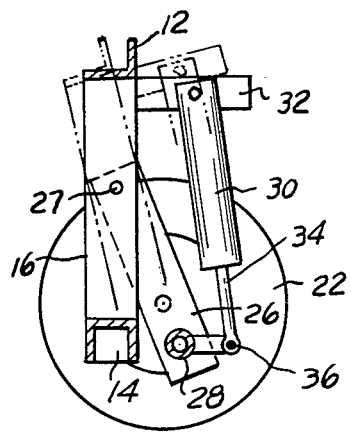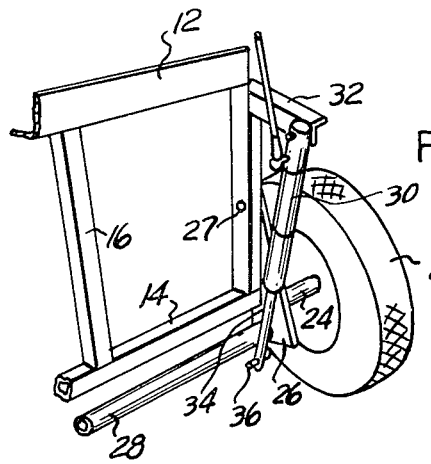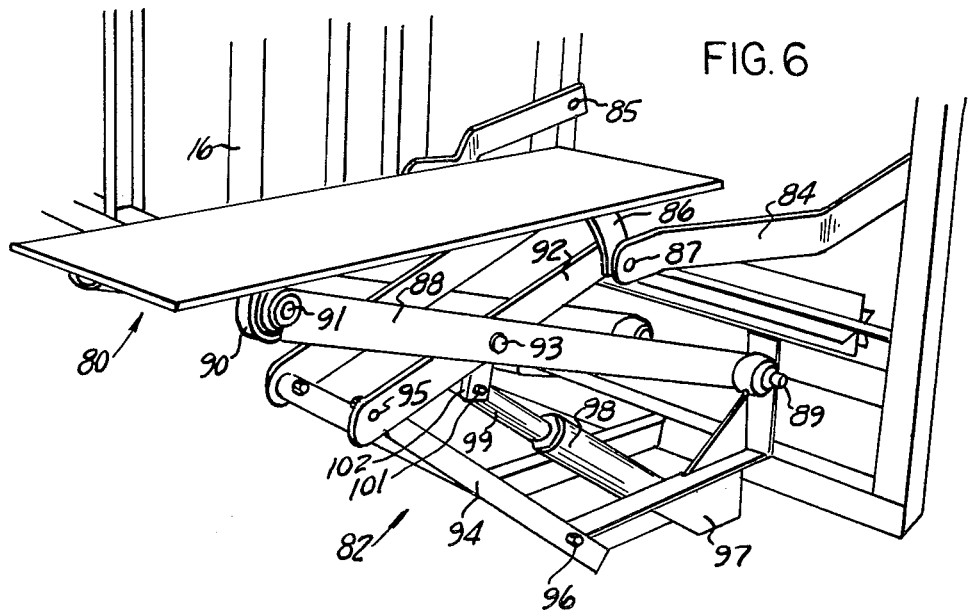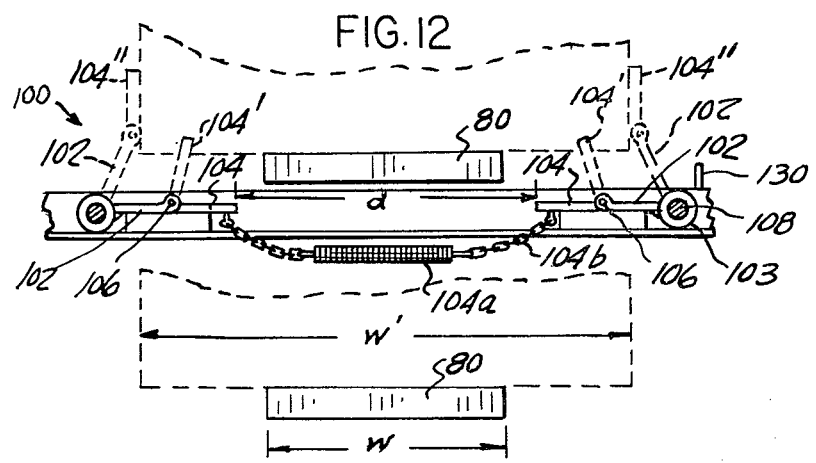

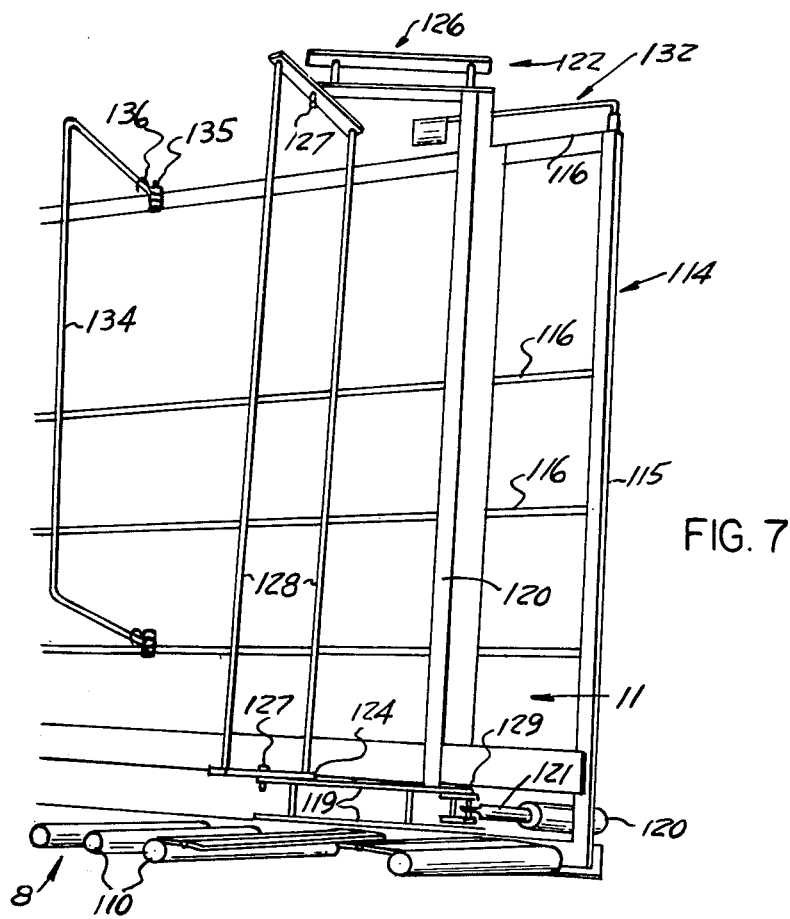
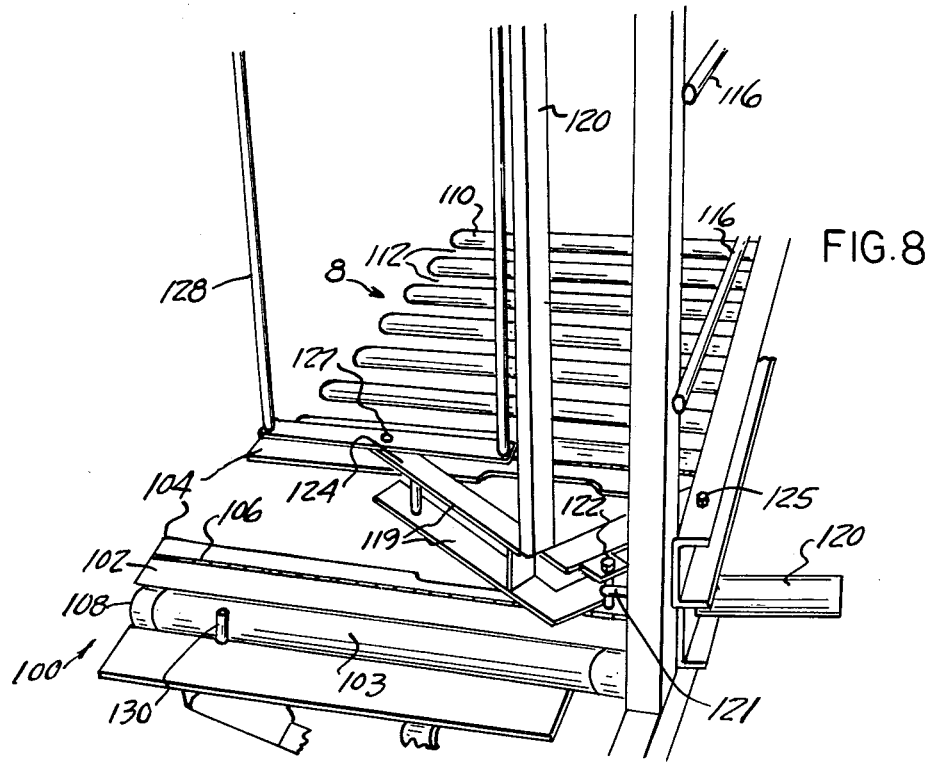

BALE LOADING AND STACKING APPARATUS

This is a division, of application Ser. No. 227,850, filed in the U.S. Patent Office on Feb. 22, 1972, now U.S. Pat. No. 3,807,579.

FIELD OF THE INVENTION

This invention relates to bale loading apparatus, and more particularly to apparatus which loads and stacks bales on a mobile platform, such as a wagon.

BACKGROUND OF THE INVENTION

With ever-increasing farm labor costs, mechanized equipment is becoming increasingly important to profitably operate a farm. The making of hay is a farm operation which requires the expenditure of substantial amounts of work and thus increased mechanization of this operation is particularly beneficial to the farmer. The advent of hay balers has substantially expedited the processing of hay, however, the movement of the bales from the field into a hay barn is an operation which has heretofore required substantial manual effort.

For years, it has been common to draw a wagon behind the baler and have a worker ride on the wagon to stack the bales thereon. "Bale throw" devices have previously been mounted on the rear of a baler to throw the bales haphazardly onto a wagon which is drawn behind the baler. Although such a device eliminates the need for a man to stack the bales, the random placement of bales does not efficiently utilize the storage space on the wagon.

To bale hay as quickly as possible, frequently the wagon is not pulled behind the baler and the bales are randomly deposited on the ground. In this case, the hay bales must be subsequently picked off the ground and stacked on the wagon and this requires substantial time and effort.

Accordingly, it is a primary object of the present invention to provide apparatus for loading and stacking bales on a wagon.

It is another object of the present invention to provide apparatus which will pick bales off the ground and stack them on a portable, longitudinal platform such that the bales are oriented lengthwisely on the platform.

It is another object of the present invention to provide loading and stacking apparatus which will form a lateral row of stacked bales which is transferred to the wagon.

It is another object of the present invention to provide apparatus for loading rows of stacked bales on a mobile platform by lengthwisely moving the bales in one row into engagement with a row of bales previously transferred to the platform to move the previously transferred row rearwardly.

Other objects and advantages of the present invention will become apparent to those of ordinary skill in the art as the description thereof proceeds.

SUMMARY OF THE INVENTION

Bale loading and stacking apparatus comprising a portable frame movable forwardly and rearwardly in a longitudinal path of travel, means on the frame for sequentially receiving and vertically stacking bales at a stacking station as the frame is moved forwardly, a bale support rack on the frame including a plurality of laterally spaced, elongated, rearwardly opening, open-ended openings therein, and means for sequentially moving the stacks laterally from said stacking station to said bale support rack to form a row of stacks on said rack.

The present invention may more readily be described by reference to the accompanying drawings in which:

FIG. 1 is a side elevational view, illustrating apparatus constructed according to the invention;

FIG. 2 is a fragmentary, side elevational view particularly illustrating brake mechanism for preventing the bale supporting wagon from inadvertently moving rearwardly when bales are being transferred thereto;

FIG. 3 is a fragmentary, top plan view of apparatus constructed according to the present invention;

FIG. 4 is a sectional side view, taken along the line 4—4 of FIG. 3, and particularly illustrating the apparatus for raising and lowering the bale loading and stacking apparatus relative to the associated bale support wagon;

FIG. 5 is a perspective front view of the apparatus illustrated in FIG. 4;

FIG. 6 is a rear perspective view illustrating the elevating platform for vertically stacking the bales at a stacking station;

FIG. 7 is a rear perspective view of the apparatus for laterally moving a stack of bales from the stacking station to the support rack;

FIG. 8 is a front perspective view of the apparatus for stripping the bales from the elevating platform at the stacking station, and apparatus for laterally moving a stack of bales from the stacking station to the support rack;

FIG. 9 is a sectional front view of the lost motion connection, taken along the line 9—9 of FIG. 3;

FIG. 10 is a front elevational view, taken along the line 10—10 of FIG. 1, illustrating the apparatus for preventing a stack of bales from falling into the stacking station after they have been moved to the support rack;

FIG. 11 is a sectional side elevational view illustrating one of the bale supporting pickup bars of the pickup conveyor; and FIG. 12 is a rear elevational view particularly illustrating the apparatus for stripping the bales from the stacking platform.

GENERAL DESCRIPTION OF THE INVENTION

Apparatus constructed according to the invention includes a loading and stacking machine, generally designated 10, for picking previously baled hay bales B off the ground and stacking them in stacks S at a stacking station, generally designated 11. The individual stacks are sequentially laterally transferred to a bale support rack, generally designated 8, to form a row of stacks. A wagon, generally designated W, which is drawn behind the loading and stacking machine 10, is temporarily held stationary while the loading and stacking machine 10 is pushed rearwardly and the bale support rack 8 is moved downwardly to deposit the row of stacks on the front of the wagon.

THE MACHINE FRAMEWORK

The loading and stacking machine 10 includes a frame, generally designated F, including a pair of laterally extending upper and lower frame bars 12 and 14 spanned by a plurality of vertical support posts 16. A draw tongue, generally designated D, is provided and includes a draw bar 19, adapted to be connected with a draft vehicle, such as a tractor generally designated T, by a conventional hitch pin 20. The tongue D also includes a pair of rearwardly diverging rails 18 fixed at their rear ends to the lower frame bar 14.

The frame F is supported on a pair of road wheels 22 journaled on a pair of laterally spaced axles 24 fixed to a pair of pivot plates 26 which are pivotally mounted on a pair of the vertical support posts 16 by pivot pins 27 (FIGS. 4 and 5). A spacer bar 28 spans the pivotal plates 26 to maintain their relative lateral positions. A pair of double-acting, fluid operated frame lowering cylinders 30 are mounted on a pair of brackets 32 fixed to the upper frame bar 12. The cylinders 30 include piston rods 34 connected to the pivot plates 26 by pivot pins 36. A manually operated valve 31 is mounted on the frame F and is provided for directing fluid to the cylinders 30 such that the piston rods 34 will be selectively retracted and extended to raise and lower the frame F on the wheels 22 between the lowered and raised positions, shown in solid and chain lines respectively in FIG. 4, for a purpose to become apparent hereinafter.

THE PICKUP CONVEYOR ASSEMBLY

A pickup conveyor assembly, generally designated 40, is mounted on the frame F and includes a pair of laterally spaced apart longitudinal side frame members 42, pivotally mounted on a driven shaft 44, which is journaled in suitable bearing support members 46 provided on the lower frame bar 14 of the frame F. An additional idler shaft 45 is journaled by the front ends of the conveyor side frame members 42 and mounts a pair of idler sprocket wheels 48. A pair of link chains 50 are trained around the idler sprocket wheels 48 and a pair of drive sprocket wheels 52 fixed to the driven shaft 44. A plurality of bale-supporting, angle members 54 upon the chains 50 and include pairs of bale-engaging teeth 46 for engaging the undersides of ground supporting bales B and lifting them off the ground as they negotiate the idler sprocket wheels 48.

After a bale B has been lifted off the ground and onto the conveyor assembly 40, as the endless conveyor chains 50 continue to move rearwardly, in the direction indicated by the arrow a (FIG. 1), the teeth 50 are withdrawn from the underside of the bale B and the bale merely rests on the rearwardly traveling cross members 54.

A drive gear 55, fixed to the conveyor drive shaft 44, drives a drive chain 44a which is also trained around a gear 58 fixed to one end of an auxiliary drive shaft 59 journaled by bearing support members 60 and 62 provided on the frame F. A bevel gear 64, fixed to the opposite end of the drive shaft 44, is driven by a complementarily beveled gear 66 which is fixed to a longitudinal main drive shaft 70 journaled in bearings 72 provided on the bracket 62. The shaft 70 is removably coupled with the power take-off shaft 71 of the tractor T by a coupling 69.

The lateral shaft 59 mounts a star wheel type assembly 74 having a plurality of circumferentially spaced vanes 74a. The drive chain 44a drives the star wheel assembly 58 in such a direction that it will propel a bale B, that is moved thereto by the conveyor cross members 54, rearwardly. A pair of ground engageable, conveyor supporting shoes 76 are provided at the forward end of the conveyor side frame members 42 for riding along the ground and a link 78 is connected between one of the vertical support posts 16 and one of the conveyor side members 42 to limit the vertical travel of the conveyor when the conveyor support shoes 76 pass over a deep ditch, or the like.

THE STACKING APPARATUS

Apparatus is provided for receiving the bales B from the pickup conveyor 40 and comprises a bale-receiving platform, generally designated 80, mounted for vertical movement on the frame F by a linkage system, generally designated 82, which comprises a pair of frame-supported links 84 pivoted on the frame F by a pair of pivot pins 85 and to a pair of lugs 86 depending from the platform 80 by a pair of pivot pins 87. The linkage system 82 includes a pair of side links 88 pivotally connected to the frame by pivot pins 89 and to a pair of rollers 90 on the platform 80 by pivot pins 91. An additional pair of relatively shorter side links 92 are pivotally connected to the pivot pins 87 and to the cross links 92 by a pivot pin 93 spanning the links 92. A pair of vertical side links 94 are pivotally connected to the opposite ends of the links 92 by pivot pins 95 and to brackets 97 mounted on the frame F by pivot pins 96. A single-acting, fluid-operated, cylinder 98 is mounted on the frame F and includes a piston rod 99 pivotally connected at 101 with a bracket 102 fixed to the pivot pin 93 spanning the side rails 92.

The cylinder rod 99, when extended, will move the platform 80 from the lower bale-receiving position, illustrated in FIGS. 1 and 6, to a raised position, illustrated in chain lines in FIG. 1, for a purpose to be presently described. A manually operated valve 98a is provided for selectively directing fluid to the cylinder 98 so as to selectively move the piston rod 99 in opposite directions.

Disposed above the stacking platform apparatus illustrated in FIG. 6 is a pair of stripping members, generally designated 100 (FIG. 12), for sequentially stripping the bales B supported on the raised platform 80. Each of the stripping assemblies 100 comprises a pair of stripping plates 102 and 104 hingedly connected by a hinge pin 106, the hinge plate 102 including a cylindrical section 103 rotatably mounted on a pivot pin 108 fixed to the frame F. The stripper plates 104 are disposed in the path of a bale B being raised upwardly on the platform 80 so as to swing upwardly and outwardly initially about the hinge pins 106 to the position shown at 104' and then about the piston pins 108 to the position designated 104''. The stripper plates 104 are yieldably biased to the solid line positions by a pair of springs 104a and a pair of chains 104b connected between the frame F and the stripper plates 104. The distance d between the plates 104 in the stripping position, illustrated in chain lines, is greater than the width w of the platform 80, but less than the width w' of the bales B. The plates 102 and 104 will move from the solid line positions, shown in FIG. 12, to the chain line positions 102'' and 104'', shown in FIG. 12 to permit the bale B and the platform 80 to pass upwardly therebetween to the chain line positions shown in FIG. 12. The valve 98a is then operated to retract the piston rod 99 and move the platform 80 downwardly to the solid line position shown in FIG. 12. At this time, the plates 104 have already been returned, by the springs 104a, to the solid line positions shown in FIG. 12, so that they will be in the path of the bale B and will strip it from the platform 80 as the platform moves downwardly.

When a subsequent bale B is received on the platform 80, the platform 80 will be moved upwardly to again swing the stripping assemblies 100 from the solid line positions to the chain line positions shown in FIG. 12, and to raise the first bale B held aloft by the plates 100 upwardly to vertically stack the bales. The stripping assemblies 100 engage the underside of the second bale to hold the first and second bales aloft as the platform 80 is lowered to receive a third bale. This operation will be repeated until five bales have been stacked.

THE APPARATUS FOR FORMING A ROW OF STACKED BALES

Fixed to the upper frame bar 12 is a bale support rack 8 comprising a plurality of rearwardly extending support fingers 110 having open-ended, rearwardly opening spaces 112 therebetween for a purpose to be described more particularly hereinafter. The support fingers 110 support stacks S of bales B sequentially moved thereto in a manner to be later described. As can be best visualized in FIG. 1, the fingers 110 are inclined downwardly, forwardly so that the stacks S of bales B on the support fingers will lean forwardly against a vertical frame 114 including a pair of vertical side frame members 115 fixed to the upper frame bar 12 and spanned by a plurality of horizontal cross frame members 116.

For moving the stacks S of bales B from the stacking station, generally designated 11, a pusher assembly, generally designated 126, is provided and includes a pair of vertically spaced bell cranks 124 pivoted on upper and lower cross frame members 116 by pivot pins 125. The upper and lower bell cranks 124 are connected for simultaneous composite movement by a vertical rod 120. A pusher frame, generally designated 126, is swingably mounted on the ends of the bell crank members 124 and includes a pair of vertically spaced plates 119 pivoted on the bell cranks by pins 127 and spanned by a pair of vertical bars 128. The pusher frame 126 is swingably mounted on the bell crank 24 by the pivot pins 127 so as to always be substantially parallel to the stack S of bales being laterally transferred. If only the bell cranks 124, without the pusher frame 128, were utilized to move the stack S of bales B, the ends of the bell cranks 124 would tend to gouge the upper and lower bales as they swing in their path of travel. The bars 128, on the other hand, will merely slide across the side faces of the bales as bell cranks 124 move in their swinging path of travel.

A stop pin 130 is mounted on the outer cylindrical pivot 103 (FIG. 8) for limiting the return movement of the assembly 126 so that it will be in the same vertical position at the start of each stack pushing cycle. For swinging the bell cranks 124 in their paths of travel on the frame F, a doubleacting fluid-operated cylinder 120 is provided and includes a piston rod 121 connected with the lower bell crank arm 124 by a pivot pin 122. A valve 131 is provided for directing fluid to the cylinder 120 so as to selectively move the piston 121 to advanced and retracted positions.

When the fifth bale is moved to the stacking station S to complete the stack, the uppermost bale in the stack will have engaged the underside of a stop, generally designated 132 disposed in the path of the uppermost bale, and swing it upwardly about a pivot pin 133 from the solid line position shown in FIG. 10 to the chain line position illustrated in FIG. 10. As is best illustrated in FIG. 7, when the pusher control cylinder 120 is actuated to swing the pusher frame 126 and a stack of bales S at the stacking station 11 sidewisely onto the support rack 8, so that the stack is advanced beyond the far edge 132a of the stop 132, the stop will drop to its solid line position to prevent the stack of bales S from falling back into the stacking station 11.

To prevent the stack S transferred onto the fingers 110 from tipping in the opposite direction as the vehicle travels over rough terrain, a plurality of stack support gates, generally designated 134, are pivotally mounted on pivot pins 135 fixed to the frame supported cross bars 116. A plurality of torsion springs 136 react between the frame F and the gates 134 to bias the gates 134 to the solid line positions illustrated in FIG. 7 into the path of the stack of bales S. The stack support gates 134 are spaced from each other a distance substantially equal to the width w of a bale B. When a succeeding stack of bales S is transferred onto the support fingers 110, it will move the initial stack S a further distance sidewisely to collapse the first gate 134 about the pivot pins 135 against the force of the associated springs 136 and fold it back rearwardly against the rails 116. The two side-by-side stacks will then be held between the succeeding gate member 134 and the stop member 132.

THE BALE SUPPORT WAGON AND DRAFT CONNECTION

A bale support wagon, generally designated W, is provided and includes a bale support platform 146 supported on a pair of steerable front wheels 149b, mounted on king pins 148 in the usual manner, and a pair of axle supported rear wheels 149a (FIG. 2). The front wheels 149b are steerable by a tongue 142 which is connected to a lost motion connection mechanism, generally designated 140, on the frame F.

The lost motion connection 140 includes a pair of longitudinal rails 140a fixed to a pair of vertical posts 16 and spanned, at their forward ends, by a cross bar 140B. A connector block 147 is provided and includes longitudinal rails 147b received in a pair of tracks 140c provided in the side rails 140a. A bore 140d is provided in the connector block 147 for receiving a hitch pin 147c that also passes through the wagon draw tongue 142.

When the tractor T backs the stacking and loading apparatus frame F rearwardly, the connector block 147, which is connected to the wagon tongue 142 by the hitch pin 147c, will slide forwardly on the rails 147 until it hits the forward cross-rail 140B. When the tractor subsequently moves the frame F forwardly, the connector block 147 will be returned rearwardly to a position bearing against the vertical posts 16. A locking pin p, provided in one of the longitudinal rails 140a, is movable from a draft bar locking position, shown in solid lines in FIG. 3, restraining endwise movement of the connector block 147, to a removed position, illustrated in chain lines, permitting the connector block 147 to slide on the rails 140a. A manually operated cable w is trained around a pulley u and is fixed to the pin p to move it between the solid and chain line positions against the force of a biasing spring n urging it to the solid line position.

A rack 156 is provided at the front of the portable platform 146 and includes a plurality of longitudinally extending fingers 149 which are longitudinally staggered with the loading and stacking apparatus fingers 110. The fingers 149 comprise stripping fingers which pass through the openings 112 in the bale support rack 8 to strip the row of bales from the rack 8 as will presently be described.

To prevent the wagon W from inadvertently moving rearwardly when the tractor T moves the frame F rearwardly, a brake assembly, generally designated B (FIG. 2) is provided and includes a brake bar 150 which is dragged behind each of the rear wagon wheels 149a by a pair of tow chains 152 fixed to the wagon rack 146 forwardly of the wheels 149a. There is sufficient slack in the chain 152 to prevent the bar 150 from engaging on the tires 149a when the wagon is moving forwardly. A second set of chains 159 is also connected with the walls 150 rearwardly of the wheel 149a and permits limited forward movement of the brake bar 150 when the wagon is moved rearwardly. In the normal position, the bar 150 will be in the solid line position illustrated in FIG. 2. If the wagon W inadvertently backs up as may be the case if the wagon is on a slope, the bars 150 will remain stationary, however, the wagon wheels 149a will continue to back up until it engages the member 150, as shown in chain lines in FIG. 2, to prevent further rearward movement of the wagon. Vertical side posts 160 are mounted at opposite ends of the wagon and side chains 162 span the posts to prevent the load of bales from tipping sidewisely off the wagon.

THE OPERATION

The draft tongue D of the stacking apparatus is connected to the tractor T by a draw pin 20 and the tongue 142 of the wagon W is connected to the connection bar 147 of the lost motion connection mechanism 140 by a draw pin 147c. The tractor is then driven forwardly to pull the frame F and the wagon W in a longitudinal forward path of travel in such a manner that a conveyor 40 will be longitudinally aligned with a bale B on the ground. The teeth 56 on the conveyor will penetrate the bale B and lift it upwardly and rearwardly on the chains 50 and the support members 54 which move the bale upwardly as shown in FIG. 1. As the bale negotiates the uppermost chain drive sprockets 52 of the conveyor 40, it will engage the star wheel assembly 58 and be batted rearwardly onto the loading platform 80.

The manually operated valve 98a is operated to direct fluid to the bale elevating cylinder 98 in such a manner as to extend the piston 99 and move the bale support platform 80, and the bale B supported thereon, upwardly from the solid line position, illustrated in FIG. 1, to a position above the bale stripping fingers 102 and 104. As the bale B is moved upwardly, the stripping plate assemblies 100 swing between the solid line and chain line positions shown in FIG. 12 to permit the bale B to be moved to the chain line position illustrated in FIG. 12. The bale elevating control valve 98a is then operated to permit fluid in the bale elevating cylinder 98 to pass to the reservoir as the weight of the bale and the platform force the piston 99 to retract and lower the bale support platform 80 between the stripper plates 102 and 104. As the bale support platform 80 moves downwardly, the bale B is stripped therefrom by the stripping fingers 100 which have been returned to the solid line position by the springs 104a and held aloft in the raised position. A second bale, picked up by the conveyor assembly 40, is delivered to the bale support platform 80 which is again elevated to swing the stripping fingers outwardly to the chain line positions and raise the first bale to a still higher position. The second bale, which is moved to the chain line position shown in FIG. 12, is stripped from the platform 80 by the stripping fingers 100 to hold the first and second bales in stacked relation. This operation is repeated until a stack of five bales is supported on the stripping fingers 102 and 104.

The valve 131 is then actuated to advance the pusher control piston 120 to swing the pusher frame 126 from a position engaging the stop 130 to the stack advancing position illustrated in FIGS. 7 and 8. As the stack of bales S is moved sidewisely by the pusher frame 126 onto the bale support rack 8, the vertically swingable stop member 132, which is initially swung upwardly from the solid line position to the chain line position as the stack is formed, will then swing downwardly behind the trailing edge of the stack of bales to prevent its sidewise movement back into the station 11. Successive stacks of bales are moved onto the bale support rack 8 to push the stacks previously moved thereto sidewisely and successively collapse the swingable stack holding gates 134.

When a complete row has been provided on the support fingers 110, the cable w is pulled to move the connector block holding pin p to a removed position and the tractor T is backed up so that the fingers 110 are generally superposed with the wagon stripping fingers 149. The wagon W, which is not driven rearwardly because of lost motion connector mechanism 140, is positively prevented from inadvertently moving rearwardly by the brake bar members 150. The valve 31 is then operated to move the frame position control pistons 34 so as to permit the wheels 22 to pivot upwardly about the pins 27 so that the frame F will lower and the bale supporting fingers 110 will pass downwardly between the wagon supported stripping fingers 149. As is readily apparent, when the pistons 34 are retracted and the wheel mounting plates 26, are thus pivoted about the pivot pins 27, the frame F will drop vertically downwardly while maintaining the horizontal orientation of the bale support rack 8 substantially constant. The tractor T is then moved forwardly to move the frame F forwardly and when the draw bar 147 reaches the rearward end of its slide, the wagon W will also be drawn forwardly. The frame elevating cylinder 30 is operated to extend the piston 34 and the wheels 22 will move from the chain line position, illustrated in FIG. 4, to the solid line position, illustrated in FIG. 4, so that the frame F moves upwardly relative to the wagon W. The hay bales B are stacked lengthwisely on the wagon rack 146 and will not easily tip off the front or rear ends of the wagon.

The operation will be repeated until a second row of stacked bales is provided on the fingers 110 and the tractor T and the frame F will again be moved rearwardly. As is best illustrated in FIG. 1, the ends 110a of the fingers 110 will engage the stacks S' of bales B on the wagon W to move the stack S' rearwardly and allow for the newly formed stacks S to be transferred thereto. This operation is repeated until the wagon is completely filled with stacks of bales.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Bale loading and stacking apparatus comprising:
   a mobile platform, such as a wagon or the like, for supporting stacks of bales and adapted to be moved forwardly in a longitudinal path of travel, said platform having a plurality of longitudinally extending, laterally spaced apart stripping fingers thereon;
   a portable framework adapted to be moved forwardly in a longitudinal path;
   a plurality of longitudinally extending, laterally spaced support members on said framework having rearwardly opening, open-ended slots therebetween longitudinally aligned with the stripping fingers;
   draft bar connection means connecting said platform to said framework for longitudinal forward movement therewith but permitting relative movement of said platform and said framework between spread and less spread positions to move said fingers and said support members between longitudinally spaced and generally superposed positions;
   means for delivering a plurality of stacks of bales to said support members to form a row of bale stacks thereon when the platform and framework are in said longitudinally spread positions; and
   means for vertically moving at least one of said support members and said fingers relative to the other to pass said support members through the openings on said framework and transfer said row of stacked bales from said support members to said fingers when said wagon and said support members are in said superposed positions.

2. The apparatus of claim 1 wherein said laterally spaced support members engage and rearwardly move the immediately preceding row of stacks transferred to the platform.

3. The apparatus set forth in claim 1 wherein said wagon includes a brake assembly for preventing rearward movement of the platform when the portable framework moves rearwardly but automatically releasing to permit forward movement of the platform.

4. Bale loading and stacking apparatus comprising:
   a portable frame movable forwardly and rearwardly in a longitudinal path of travel;
   a bale support rack on said frame including a plurality of laterally spaced, elongated, rearwardly opening, open ended openings therein;
   a mobile platform for receiving stacks of bales from said rack including bale stripping members at the forward end of said platform longitudinally aligned with said openings; and
   means for selectively coupling said mobile platform and said frame for concurrent forward movement in longitudinally spaced positions and for selectively decoupling said platform and frame to permit said frame and rack to move longitudinally, bodily forwardly independently of said platform, said coupling means including lost motion draft bar connection means permitting relative longitudinal movement of the coupled frame and platform to less spread positions to superpose said rack above said platform so that bales supported by said rack can be transferred to said bale stripping members.

5. Bale loading and stacking apparatus comprising:
   a portable frame, movable forwardly and rearwardly in a longitudinal path of travel, having a bale support rack for supporting stacks of bales;
   a bale platform, adapted to be drawn forwardly by said frame, for receiving stacks of bales from said rack and supporting said stacks of bales;
   means for selectively coupling said platform and said frame for concurrent forward bodily movement when said frame is moved forwardly and for selectively decoupling said platform and frame to permit said frame and rack to move bodily forwardly independently of said platform, said coupling means including means coupling said platform and frame for limited relative longitudinal bodily movement when said frame is moved longitudinally rearwardly to move bales rearwardly to positions overlying said mobile platform, and
   means mounting said rack for vertical movement between a raised position and a lowered position to deposit the stacked bales on said platform when said rack is moved rearwardly to said position overlying said platform.

6. Bale loading and stacking apparatus comprising:
   a mobile platform, having a bale support rack for supporting stacks of bales;
   a portable frame movable longitudinally forwardly and rearwardly in a longitudinal path of travel;
   means for selectively coupling said mobile platform to said portable frame for longitudinal movement therewith in longitudinally spaced positions and for longitudinal movement relative thereto to less spaced positions and for selectively decoupling said platform and frame to permit said frame to move longitudinally bodily forwardly independently of said platform; and
   means on said platform for stripping the row of stacks from said rack when said portable frame and said platform are in said less spaced positions.

* * * * *